United States Patent
Alasti et al.

(10) Patent No.: US 12,414,114 B2
(45) Date of Patent: Sep. 9, 2025

(54) CROSS LINK INTERFERENCE MITIGATION FOR FULL DUPLEX WIRELESS SYSTEMS

(71) Applicant: DISH WIRELESS L.L.C., Englewood, CO (US)

(72) Inventors: Mehdi Alasti, Reston, VA (US); Gurpreet Sohi, Parker, CO (US); Siddhartha Chenumolu, Broadlands, VA (US)

(73) Assignee: DISH Wireless L.L.C., Englewood, CO (US)

(*) Notice: Subject to any disclaimer, the term of this patent is extended or adjusted under 35 U.S.C. 154(b) by 374 days.

(21) Appl. No.: 17/992,123

(22) Filed: Nov. 22, 2022

(65) Prior Publication Data

US 2024/0172226 A1    May 23, 2024

(51) Int. Cl.
*H04W 72/12* (2023.01)
*H04L 5/14* (2006.01)
*H04W 72/1273* (2023.01)
*H04W 72/54* (2023.01)

(52) U.S. Cl.
CPC ........... *H04W 72/1273* (2013.01); *H04L 5/14* (2013.01); *H04W 72/54* (2023.01)

(58) Field of Classification Search
CPC ...... H04W 72/54; H04W 72/1273; H04L 5/14
See application file for complete search history.

(56) References Cited

U.S. PATENT DOCUMENTS

| | | |
|---|---|---|
| 6,259,752 B1 | 7/2001 | Domino et al. |
| 6,697,613 B1 | 2/2004 | Domino et al. |
| 2006/0211389 A1 | 9/2006 | Lin et al. |
| 2022/0014954 A1* | 1/2022 | Ibrahim ................ H04L 5/0051 |
| 2023/0146833 A1 | 5/2023 | Ibrahim et al. |
| 2023/0164824 A1 | 5/2023 | Kusashima et al. |
| 2023/0345518 A1 | 10/2023 | Zhang et al. |
| 2024/0097869 A1* | 3/2024 | Lee ...................... H04B 17/345 |
| 2024/0121649 A1 | 4/2024 | Lee et al. |
| 2024/0298198 A1* | 9/2024 | Ibrahim ................ H04W 24/10 |

(Continued)

FOREIGN PATENT DOCUMENTS

| | | |
|---|---|---|
| KR | 10-2024-0047695 A | 4/2024 |
| WO | 2021/138128 A1 | 7/2021 |

(Continued)

OTHER PUBLICATIONS

Abdulhasan, Muntadher Qasim, et al., "Review of channel quality indicator estimation schemes for multi-user MIMO in 3GPP LTE/LTE-A systems", KSII Transactions on Internet and Information Systems vol. 8, No. 6, Jun. 2014, pp. 1848-1868.

(Continued)

*Primary Examiner* — Kent Krueger
(74) *Attorney, Agent, or Firm* — Jeremiah J. Baunach; Frontier IP Law PLLC

(57) ABSTRACT

Cross Link Interference (CLI) within a wireless network is mitigated by characterizing a communication path that introduces the CLI on an uplink resource. Mitigation is achieved by receiving, from a neighboring device, information related to a downlink resource scheduling decision. The neighboring device then delays its downlink resource transmission. Transmissions received on an uplink resource may then be corrected.

20 Claims, 9 Drawing Sheets

(56) References Cited

U.S. PATENT DOCUMENTS

2024/0373421 A1* 11/2024 Jang .................. H04L 5/0012

FOREIGN PATENT DOCUMENTS

| WO | 2022/029196 A1 | 2/2022 |
|---|---|---|
| WO | 2023/128080 A1 | 7/2023 |

OTHER PUBLICATIONS

Venkatasubramanian, Sathya, et al., "Cross-link interference in TDD networksand what to do about it", Ericsson Blog, Jun. 10, 2020, 7 pages.

Guimarães, Francisco Rafael Vasconcelos, et al., "Interference Management for 4G Cellular Networks and Beyond", Universidade Federal Do Ceará, Centro De Tecnologia Departamento De Engenharia De Teleinformática Programa De Pós-Graduação Em Engenharia De Teleinformática, 2018, pp. 1-113.

Kundu, Lopamudra, et al., "Physical Uplink Control Channel Design for 5G New Radio", Next Generation and Standards, Intel Corporation, Sep. 13, 2022, 6 pages.

Liberg, Olof, et al., "Physical Resource Block LTE-M", ScienceDirect; Cellular Internet of Things (Second Edition), 2020, 21 pages.

Lin, Xingquin, et al., "An Overview of 5G Advanced Evolution in 3FPP Release 18", IEEE, Aug. 26, 2022, 8 pages.

International Search Report and Written Opinion received for PCT Patent Application No. PCT/US2023/036136, mailed on Apr. 16, 2024, 14 pages.

Mehdi Alasti et al., "Uplink and Downlink Resource Scheduling to Mitigate Interference," U.S. Appl. No. 17/992,014, filed Nov. 22, 2022. (35 Pages).

* cited by examiner

CROSS LINK INTERFERENCE MITIGATION FOR FULL DUPLEX WIRELESS SYSTEMS

TECHNICAL FIELD

This patent relates to mobile wireless communication systems, and more particularly relates to mitigation of cross link interference in networks that assign uplink and downlink resources in full duplex.

BACKGROUND

The Third Generation Partnership Project (3GPP) Radio Access Network (RAN) working group recently approved its Release 18, generally considered as the initial version of what is now known as the 5G Advanced wireless communication specification. Release 18 is expected to significantly boost 5G performance and support a wide variety of new use cases. These include new operational frequency bands, energy savings, network coverage, mobility improvements, Multiple Input Multiple Output (MIMO) antennas, and positioning services. Support is also provided for Ultra Reliable Low Latency Communication (URLLC), Reduced Capability (RedCap) devices, broadcast services, and Non-Terrestrial Networks (NTNs).

Release 18 continues to treat radio spectrum as a scarce resource. Therefore, further enhancements enable greater flexibility in the use of spectrum. One of these enhancements is the ability for a base station (gNodeB) to operate in full duplex mode. More specifically, Release 18 considers the feasibility of allowing the coexistence of downlink and uplink at the same time within a conventional Time Division Duplex (TDD) channel bandwidth. With one suggested approach, the TDD channel bandwidth is divided into non-overlapping frequency resources, and timeslots are divided between downlink and uplink resources.

SUMMARY OF PREFERRED EMBODIMENTS

Preferred embodiments of the methods, apparatus and systems described herein provide for assignment of uplink and downlink radio resources such that intra-operator and inter-operator interference is mitigated.

More particularly, a wireless network may establish wireless communication between base station and one or more user equipment devices. An uplink resource and a downlink resource are determined, each specified by a respective time domain resource and frequency domain resource. These resources may be chosen to enable full duplex operation at least part of the time.

In some implementations, Cross Link Interference (CLI) imposed by the uplink resource may be cancelled. Cancelling the CLI may involve characterizing the communication path that introduces the CLI (such as by determining its transfer function). The base station is also informed of a downlink scheduling decision by a neighboring base station. The neighboring base station may then delay its downlink transmission, say by at least a single time slot, so that the base station may correct the radio frequency signal it receives on the uplink.

The Transmissions May be Corrected from $$X1*h1+Y2*h21$$

where * indicates convolution, h1 is the uplink resource estimate, X1 is the signal transmitted on the uplink resource, and Y2 is the downlink signal transmitted by the neighboring basestation, and h21 is the characterization of the communication path that introduces the CLI.

A relative spacing between the frequency resource allocated for the uplink and the frequency resource allocated for the downlink may optionally depend on a Channel Quality Index (CQI) parameter or some other indicator of radio frequency (RF) signal strength. Communication between the base station and user equipment device using the uplink resource and the downlink resource is then enabled.

If communication between the base station and the user equipment is of the Ultra Reliable Low Latency Communication (URLLC) type, then communications are not delayed. Instead, the uplink frequency resource is chosen from a first group of resources. The downlink frequency resource is assigned from within a second group, but its position within the second group is chosen to be as far from the uplink frequency resource as possible, and regardless of the CQI.

In some implementations, an Artificial Intelligence/Machine Learning (AI/ML) engine may further determine if a particular user equipment device, even though it is experiencing low CQI, is unlikely to be experiencing interference from other devices. When so indicated by the AI/ML engine, the spacing between the downlink and uplink frequency resources may be closer than it would be otherwise.

BRIEF DESCRIPTION OF THE DRAWINGS

Additional novel features and advantages of the approaches discussed herein are evident from the text that follows and the accompanying drawings, where.

DETAILED DESCRIPTION OF ILLUSTRATIVE EMBODIMENT(S)

Figure 1:
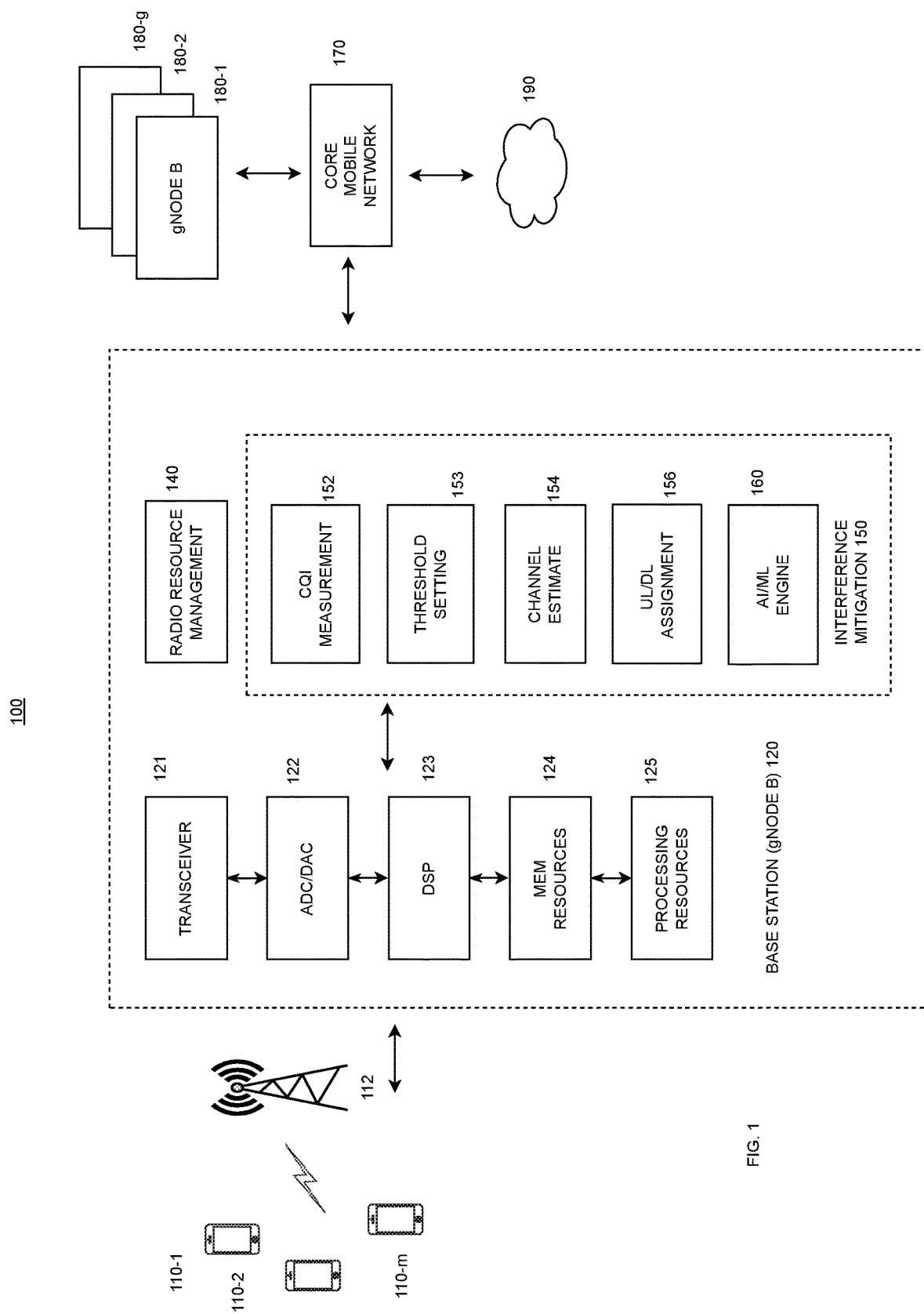
FIG. 1 is a block diagram of a mobile wireless communication system that assigns uplink and downlink resources to mitigate interference.

FIG. 1 is a block diagram of a wireless communication system 100 according to one embodiment. The wireless communication system 100 includes multiple user equipment (UE) devices 110-1, 110-2, . . . , 110-$m$, a base station antenna 112 and a base station 120. The base station 120 enables the UEs 110 to communicate with other UEs 110 or to send and receive data and/or voice via other networks 190 such as the Internet and/or voice networks. In one embodiment, base station 120 may provide service to UEs 110 located in a particular cell or cell sector.

The base station 120 includes a transceiver 121, Analog to Digital (ADC) and Digital to Analog (DAC) converters 122, Digital Signal Processor(s) (DSPs) 123, memory resources 124, and processing resources 125. The transceiver 121 transmits and receives mobile communication signals to and from the UE 110 via antenna(s) 112, and to and from other base stations, and to and from other communication systems 190. The ADC and DAC 122 convert the analog signals needed by the transceiver 121 to digital signals processed by the DSPs 123.

The memory resources 124 include one or more computer readable media that store software instructions for establishing a mobile communication network with the base station 120. The processing resources 125 execute the instructions stored in one or more computer readable media of the memory resources 124 to process the signals provided by and to the DSPs 123. As set forth in more detail below, execution of the software instructions also causes the Radio Resource Management 140 and Interference Mitigation 150 to establish and assign uplink and downlink resources in a particular way. As will be explained in more detail below, Interference Mitigation 150 may include functions such as Channel Quality Measurement 152, Threshold Settings 153, Channel Estimates 154 and/or Uplink/Downlink (UL/DL) assignment 156. Artificial Intelligence (AI)/Machine Learning (ML) engine 160 may also assist with Interference Mitigation 150 and be implemented by software instructions executing on the same or different processing resources 125 and memory resources 124.

The memory resources 124 and processing resources 125 may be implemented as one or more special-purpose or general-purpose processors. Such special-purpose processors may include processors that are specifically designed to perform the functions detailed herein. Such special-purpose processors may be Application Specific Integrated Circuits (ASIC)s or Field Programmable Gate Arrays (FPGA)s which are general-purpose components that are physically and electrically configured to perform the functions detailed herein. Such general-purpose processors may execute special-purpose software that is stored using one or more memory resources 124 such as non-transitory processor-readable mediums, including random access memory (RAM), flash memory, a hard disk drive (HDD), or a solid state drive (SSD).

Base station 120 may include a 5G New Radio (NR) compliant gNodeB and use a 5G compliant Radio Access Technology (RAT) and Core Mobile Network 170 infrastructure. Core Mobile Network 170 may be in communication with other neighboring gNodeBs 180-1, 180-2 . . . 180-g.

However other RATs and other types of network infrastructure can be used. For example, if system 100 is a 4G Long Term Evolution (LTE) network, the base station 120 may be an eNodeB. Therefore, while mobile communication system 100 in one embodiment implements 5G and gNodeBs, the uplink and downlink on bandwidth part schemes detailed herein are applicable to other types of wireless systems 100, such as a 4G Long Term Evolution (LTE) wireless networks, that uses eNodeBs in place of gNodeBs. Also, system 100 in the described embodiments operates according to the 5G New Radio (NR) radio access technology (RAT). However, in other embodiments, a different RAT may be used, such as 4G Long Term Evolution (LTE), Third Generation (3G) or some other RAT.

An example use case for some embodiments is where the wireless communication system 100 is owned and/or operated by a Mobile Network Operator (MNO) or other wireless system operator. The operator of system 100 (which may also be referred to as an "enterprise") typically directly owns or controls all the elements necessary to sell and deliver wireless services to an end user of UEs 110, including radio spectrum license(s), operation of wireless network infrastructure components, back haul, provisioning systems, billing, and customer care The operator may also offer access to the spectrum by other enterprises such as Mobile Virtual Network Operators (MVNOs) who provide service to the public, Non-Public Network (NPN) providers, or private organizations such as a corporation, a municipality, a university campus, etc.

UEs 110 are various types of wireless computerized devices. For instance, UEs 110 can be smart phones, cellular phones, laptop computers, tablet computers, gaming devices, smart home devices, Internet of Things (IoT) devices, or any other computerized device configured to use the appropriate RAT to communicate with base station 120.

UEs 110 may also include one or more access points (APs) that further provide network access to one or more other devices. For instance, some devices may be able to communicate wirelessly with an AP via Wi-Fi or Bluetooth or Near Field Communication (NFC). The AP may communicate locally with devices using Wi-Fi and communicate with base station 120 using a different RAT.

As described in more detail below, functions including BWP Management 140 and Interference Mitigation 150 may be provided directly by gNodeB 120, or by Core Mobile Network 170, or some combination of the two, or by a separate function in communication with Core Mobile Network 170 or gNodeB 120.

More particularly, Radio Resource Management 140 and Interference Mitigation 150 are responsible for scheduling communications between the base station 120 and UEs 110. According to 5G Release 18, Physical Resource Blocks (PRBs) may be allocated across the radio bandwidth assigned to a base station 120. Each PRB may define a time domain resource, such one or more timeslots, on a particular frequency resource (such as one or more subcarrier frequencies). PRBs may be assigned as uplink resources and downlink resources. The number of PRBs scheduled for a given base station 120 may depend on the overall bandwidth available to the operator of the system 100 and on the subcarrier spacing (SCS) within that bandwidth.

As mentioned previously, duplex operation can be provided by allowing the coexistence of downlink and uplink resources within the bandwidth of a given Time Division Duplex (TDD) channel. With one approach, the available TDD channel bandwidth is divided into non-overlapping frequency resources, and then timeslots are further assigned as to uplink and downlink functions. In an embodiment herein, the assignment of PRBs to either uplink or downlink may be implemented by the UL/DL assignment 156 function as part of Interference Mitigation 150.

Figure 2:
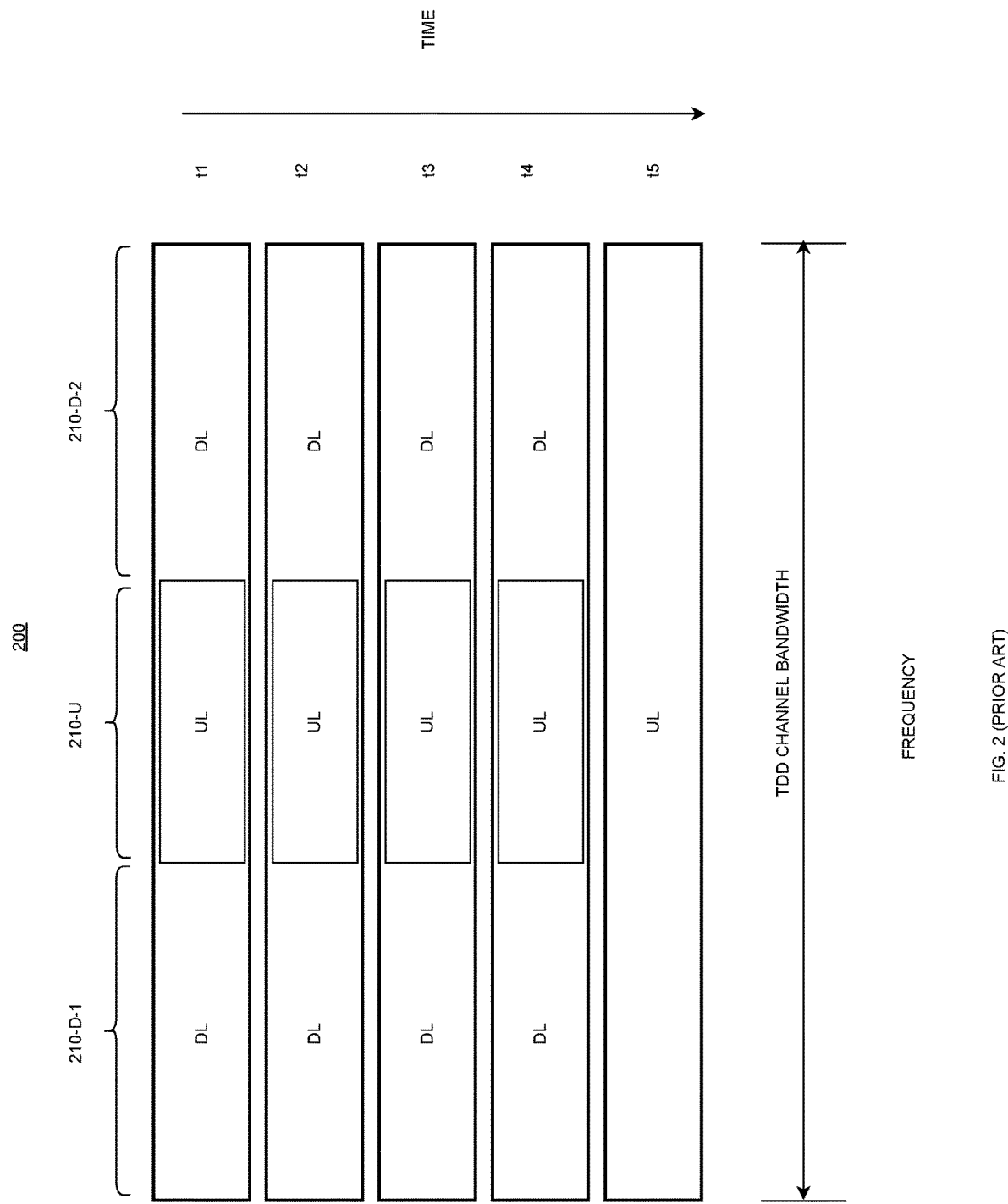
FIG. 2 illustrates a prior art Third Generation Partnership Project (3GPP) Release 18 duplexing evolution scheme to assign uplink and downlink resources.

FIG. 2 shows one example prior art scheme 200 for allocating uplink and downlink PRBs to provide subband full duplex (SBFD) within a carrier or in multiple aggregated carriers. This particular scheme supports the coexistence of multiple downlink and uplink resources within a TDD channel 220.

PRBs are assigned such that the TDD channel 220 is divided into multiple nonoverlapping PRBs, with some PRBs designated for uplink and others designated for downlink. In many use cases, such as Internet access, streaming media applications and the like, downlink traffic from the base station 120 to the UEs 110 is greater than uplink traffic from the UEs 110 to the base station 120. Therefore it may be advantageous to assign more downlink channels than uplink channels in each timeslot.

In this example implementation, the bandwidth for TDD channel 220 may be available within a single radio frequency carrier or may comprise multiple aggregated carriers. The TDD channel bandwidth, in one example, may be 20 MHz which is then divided into 106 PRBs, each 180 kHz wide. During first timeslot t1, a first subgroup 210-D-1 of these 106 PRBs is assigned to downlink, a second group of frequency resources 210-U-1 is assigned to uplink, and a third group of these frequency resources 210-D-2 is assigned to downlink. In this example, the first group 210-D-1 may include forty (40) PRBs, the second group 210-U may include thirty six (36) PRBs, and the third group 210-D-2 may include the remaining thirty (30) PRBs.

The assignments in timeslots t2, t3, and t4 could be the same as the assignments in timeslot t1. Timeslot t5 is dedicated to uplink only in this scenario.

With this approach, uplink PRBs in timeslots t1 to t4 are deployed using only the frequency resources located in the center block of the TDD channel, with downlink resources deployed using the frequency resources on either side of the center block.

The pattern then could dynamically change in some defined way on each timeslot, or repeat on a semi-persistent fashion for subsequent timeslots after t5.

This approach therefore permits implementing Frequency Division Duplex (FDD) during timeslots t1-t4 (by assigning uplink and downlink resources simultaneously using different frequency resources in a given timeslot). This is generally the preferred method for communication with UEs located in most areas of a typical cell.

This approach for assignment of uplink and downlink resources also permits implementing Time Division Duplex (TDD), such as by assigning uplink and downlink resources on the same frequency resources but in different timeslots.

FDD can be the preferred approach for UEs that are located on the outer edge of a cell. This is because cell edge devices often operate with limited link budget and at relatively high power, and are more susceptible to interference from other base stations. Cell edge devices are thus more reliant on schemes for improving reception such as by resolving multipath. By implementing both uplink and downlink on the same subcarrier for these cell edge UEs, channel propagation estimates measured on a downlink frequency resource will more accurately reflect necessary adjustments to the transmit parameters for uplink transmissions which occur using the same frequency resource.

However, TDD provides a number of advantages compared to FDD in some instances. TDD generally provides more flexible and efficient use of the available download and upload resources based on traffic volumes. With TDD, the assignment of download and upload frequency resources can more easily be made semi-static, or even dynamic based on measured demand. In addition, many of the newly available spectrum bands for 5G are located at higher carrier frequencies and provide significantly higher bandwidth as compared to the legacy FDD frequency bands. Furthermore, MIMO performance is improved with TDD. Because the same subcarrier is used for both uplink and downlink, any adjustments derived from receiver signal processing are more accurately applied to the transmit side.

TDD has a disadvantage when it comes to Ultra Reliable Low Latency Communication (URLLC). Because TDD exhibits a slight time delay (due to the fact that transmit slots are only available part of the time) compared to FDD (where transmit slots are always available), some TDD packets will be slightly delayed.

TDD also exhibits reduced link budget. In particular, lower signal-to-noise ratio is available in TDD than with FDD when transmitting at peak power. That is because a transmitter operates over one-half the available bandwidth all of the time in FDD, but transmits over the entire bandwidth half of the time in TDD. As a result, the transmit power amplifier is only active half of the time, effectively reducing average radiated power in half.

Furthermore, TDD suffers from inter-cell interference more readily than FDD. This is due to the fact that a downlink at the cell edge can be impacted by out of band emissions of the uplink of adjacent cells or sectors operating on neighboring frequency resources.

Returning attention briefly to FIG. 1, the system 100 may include a Resource Management 140 function. Resource Management 140 may be implemented for a 5G NR system 100 using the processing and memory resources within gNodeB 120 and/or by processing and memory resources separate from and in communication with gNodeB 120. For other types of networks, Resource Management 140 can also be part of network management (NM) or system-level Radio Resource Management (RRM) functions.

Resource Management 140 configures the gNodeB 120 to divide available TDD channel bandwidth into PRBs, with each PRB specified by a time domain resource and a frequency domain resource. The PRBs are then used by the base station 120 concurrently for communication with different pieces of user equipment (UE) 110. The frequency domain resource for each individual PRBs may be allocated from a single subcarrier frequency or multiple aggregated subcarriers, and may be different from the frequency resources assigned to other PRBs.

As explained in more detail below, the available PRBs are assigned as either uplink or downlink PRBs by UL/DL resource management 156, in a particular way, as part of interference mitigation 150.

Figure 3:
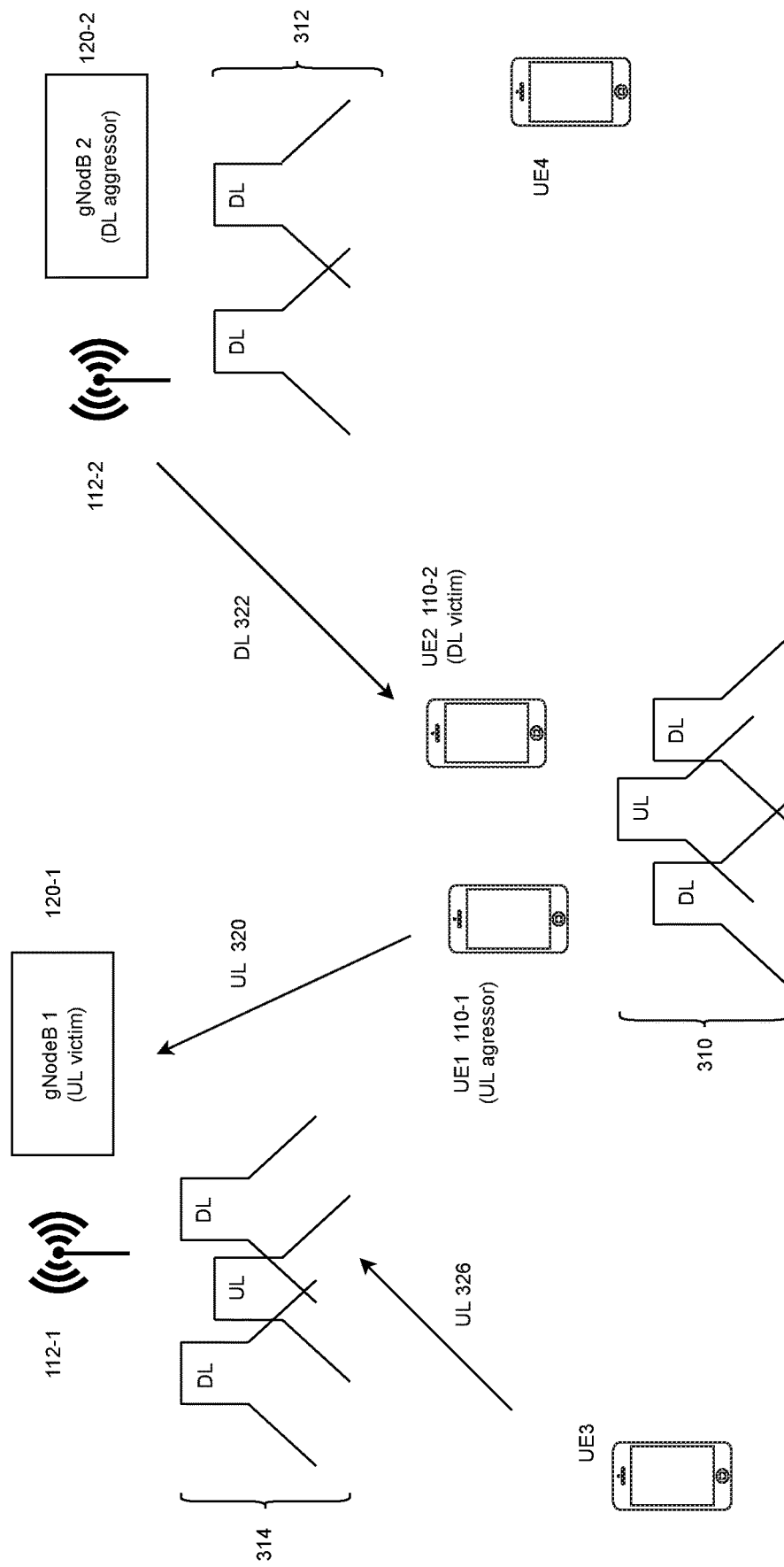
FIG. 3 illustrates intra-operator Cross-Link Interference (CLI).

FIG. 3 illustrates a typical situation where interference is possible. Here a pair of base stations gNodeB1 120-1 and gNodeB2 120-2 are servicing multiple UEs 110 using their assigned PRBs. UE1 (110-1) and UE2 (110-2) are relatively close to one another, but serviced by different gNodeBs. UE1 is located near the edge of the area serviced by gNodeB 1 (120-1) and UE2 is near the edge of the area serviced by another neighboring gNodeB 2 (120-2). gNodeB 1 and gNodeB 2 may be servicing different cell sites or different sectors of the same site.

The frequency spectrum plot 310 shown next to UE1 and UE2 shows relative signal power for the uplink (UL) and downlink (DL) PRBs near UE1 and UE2 in a particular timeslot. For example, the timeslot may correspond to timeslot t1 in FIG. 2 where PRBs in the middle of the frequency band are assigned to uplink and PRBs on one or both sides thereof are assigned to downlink.

At this instant in time, UE1 is assigned an uplink PRB, transmitting to gNodeB 1, and UE2 is receiving from gNodeB 2 on two assigned downlink PRBs.

Note that a possible Cross Link Interference (CLI) situation exists at UE2. As spectrum plot 310 shows, the received RF signal strength on the uplink PRB radiated by UE1 may be greater in power than the downlink PRB signal received by UE2. Thus UE2 is a possible "victim" and UE1 a possible "aggressor".

Cross Link Interference is also possible at gNodeB 1. As shown in spectrum plot 312, gNodeB 2 radiates on the downlink PRB with relatively high power so that it may reach UE2. However, such a strong signal may also reach gNodeB 1, and thus the received RF signal strength on the downlink PRB(s) (as radiated by gNodeB 2) may be greater than the signal strength received on the uplink from UE1. Here UE1 is considered a possible "aggressor" and gNodeB 1 a possible "victim".

Consider that a similar CLI issue may occur in the same time slot for another UE3 110-3 also serviced by gNodeB 1 on uplink 326, even though it is located away from UE2. Similarly, gNodeB 2 may experience Cross Link Interference on its own uplink, such as for yet another UE4 110-4.

To summarize, it is possible that uplink PRBs transmitted by some UEs may interfere with downlink PRBs assigned to other nearby UEs, and downlink PRBs transmitted by a gNodeB may interference with downlink PRBs assigned by other gNodeBs. This interference may become more pronounced as UEs move towards the edge of the cell (or sector).

As the frequency spectrum plots 310, 314 show, the level of interference tends to decrease as the separation between uplink and downlink PRB channels increases. A possible solution is for UL/DL assignment 156 to allocate PRBs such that relatively weak downlink PRB's (such as for UEs located at a cell edge) are scheduled to use frequency resources further away from the uplink PRBs in the same time slot. One may use a parameter, such as the value of a received signal strength indicated by a Channel Quality Indicator (CQI), to determine how to assign PRBs to subchannels. CQI may be determined by CQI Measurement function 152 as part of Interference Mitigation 150 (FIG. 1).

Figure 4:
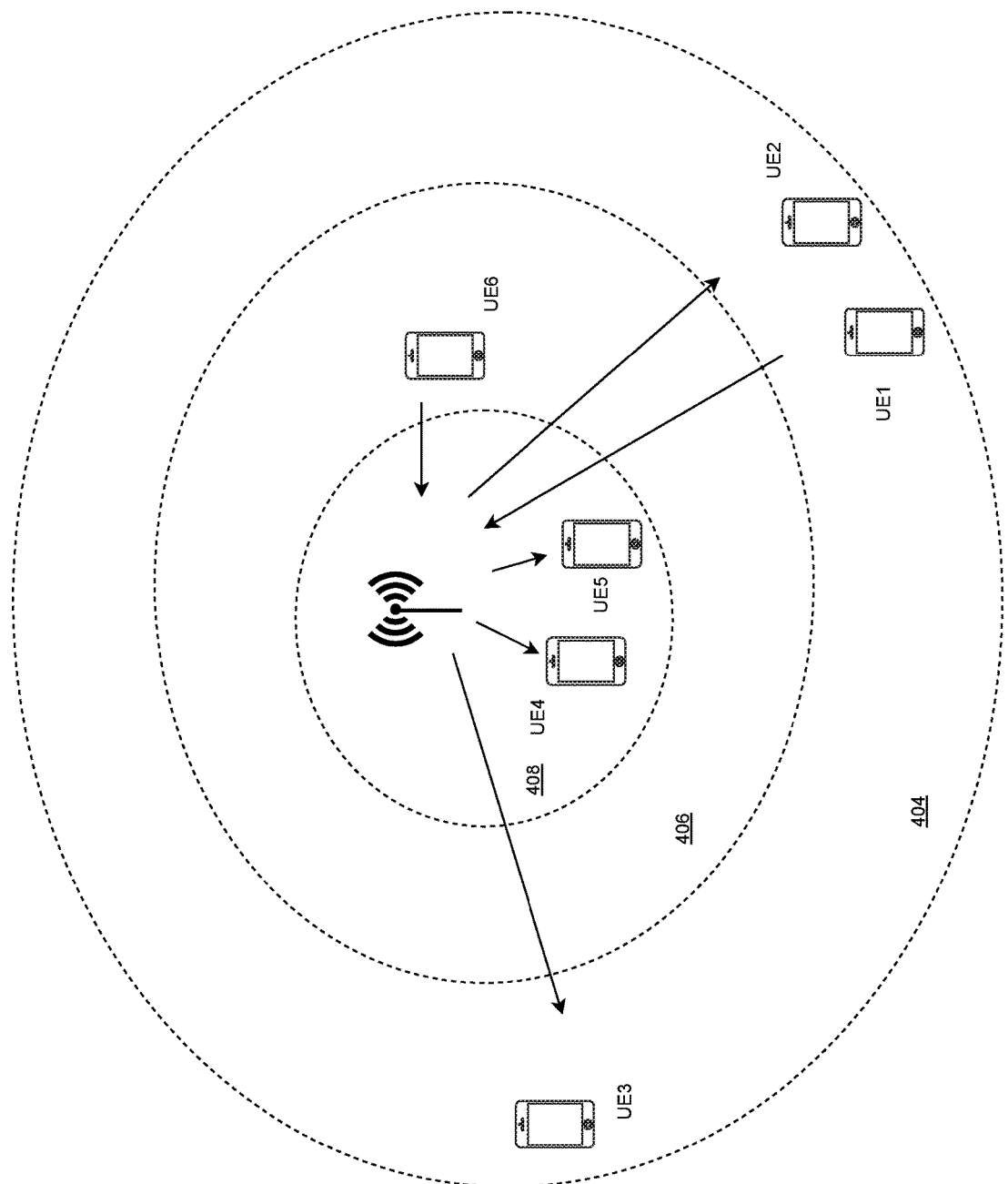
FIG. 4 illustrates a method to reduce the CLI illustrated in FIG. 3.

FIG. 4 illustrates a more general example of cell/sector where gNodeB 120 is servicing a number of UEs. At first UE1 110-1 and second UE 2 110-2 are located near the cell (or sector) edge in region 404 and adjacent one another. A third UE3 110-3 is also located near a cell edge in region 404, but away from UE1 110-1 and UE2 110-2. UE5 110-5 is located relatively close to the gNodeB 120 in region 408. UE 6 110-6 is located somewhere in region 406 between UE4 and UE 3 such that it is neither close to gNodeB nor is it at the cell/sector edge.

In this particular timeslot, UE1 and UE6 are operating in the uplink direction, and UE 2, UE3, UE4 and UE5 are operating in the downlink direction. It should be understood that FIG. 4 shows a single timeslot and that uplink and downlink assignments are potentially different for other timeslots.

The area serviced by this example cell/sector may also be divided into three regions or zones based on distance from the gNodeB, including a low CQI region 404 (furthest from the gNodeB), high CQI zone 408 (closest to the gNodeB) and a middle CQI region (between the two other region). In other example embodiments, more than three such CQI regions or fewer than three CQI regions may be defined.

Figure 5:
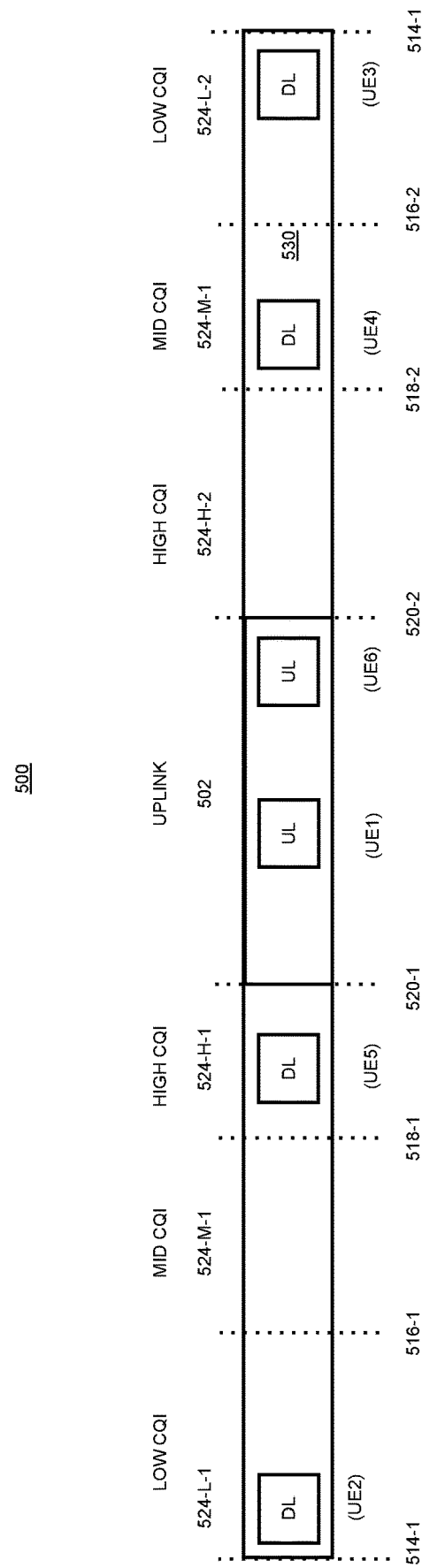
FIG. 5 shows User Equipment (UE) devices located in different positions relative to a gNodeB.

FIG. 5 is one possible approach for Interference Mitigation 150 to assign uplink PRBs and downlink PRBs to the UEs shown in FIG. 4. This approach arranges the PRBs that utilize frequency resources (such as subcarriers) located between a lower limit 514-1 and an upper limit 514-2. The PRBs are further arranged into three defined groups. A first group of PRBs 502 are assigned for uplink, and the remaining PRBs 503-1, 503-2 on either side of the first group 502 are assigned for downlink. Each group 502, 503-1, 503-2 of PRBs may include two or more PRBs that utilize frequency domain resources such as subcarriers that are contiguous or at least neighboring in frequency.

The extent of the first group 502 assigned for uplink ranges between a subcarrier 520-1 and subcarrier 520-2. Downlink group 503-1 includes frequency resources between a lower subcarrier limit or threshold 514-1 and subcarrier 520-1. Downlink group 503-2 includes frequency resources between subcarrier threshold 520-2 and upper subcarrier threshold 514-2. These thresholds may be determined by Threshold Settings 153.

Note also that downlink PRBs 503-1 may be further split into different zones. In this example, there are three downlink zones defined by thresholds 516-1 and 516-2, to provide a downlink zone 524-L-1 located between threshold 514-1 and threshold 516-1, downlink zone 524-M-1 located between thresholds 516-1 and 518-1, and downlink zone 524-H-1 located between thresholds 518-1 and 520-1.

In general, Interference Mitigation 150 prioritizes downlink zones 524-L-1 and 524-2 for use by low CQI UEs located furthest away from uplink zone 502, downlink zones 524-H-1 and 524-H-2 for use by high CQI UEs closest to uplink zone 503, and middle CQI zones 524-M-1 and 524-M-2 for other UEs.

However, if there are an insufficient number of low CQI UEs to fill the downlink zones 524-L-1 and 524-L-2, the downlink resources for the middle CQI UEs can be scheduled there, and then if they are still not filled, the high CQI UEs can be scheduled there.

In other words, the scheduler may attempt to first schedule downlink PRBs for low CQI UEs in the zones 524-1, 524-2 located furthest away from the uplink zone 502, and then schedule downlink PRBs for the middle CQI UEs in both the low zones 524-L-1, 524-L-2 and the middle downlink zones 524-M-1, 524-M-2. The downlink resources for high CQI UEs may then be scheduled in any of the remaining downlink zones.

Similarly, downlink PRBs 503-2 may be further split into three downlink zones 524-H-2, 524-M-2, 524-L-2.

UE1 and UE6 operate in this time slot in the uplink direction. Therefore they have PRBs assigned them from the center zone 502.

Interference mitigation function 150, having information from CQI Measurement 152 as to the relative receive signal strengths for the various UEs may assign downlink PRBs as follows.

UE2 has reported a low CQI (e.g., it is located far from the gNodeB in region 404 of FIG. 4) and thus is assigned a downlink PRB in zone 524-L-1.

Similarly, since UE3 also reports a low CQI, it too is assigned a downlink PRB in zone 524-L-2.

UE5 is detected as having high CQI (because it is located in region 408) and thus has been assigned a downlink PRB in zone 524-H-1 closest to uplink zone 502.

UE4, having a CQI that is neither high nor low (being located in middle region 406) is assigned a downlink PRB in zone 524-M-2.

In some implementations, there may be a guard band 530 maintained between low zone 524-L-2 and mid zone 524-M-2 where no PRBs are actively allocated. This may assist with ensuring the receive signal strength at devices such as UE4 is sufficient even while devices such as UE3 are active.

Note also that the uplink for UE6, having the larger CQI, is less susceptible to interference from downlink PRBs than, say, UE1. Therefore UE6 may be assigned an uplink PRB located closer to the edge of the center zone 502.

Figure 6:
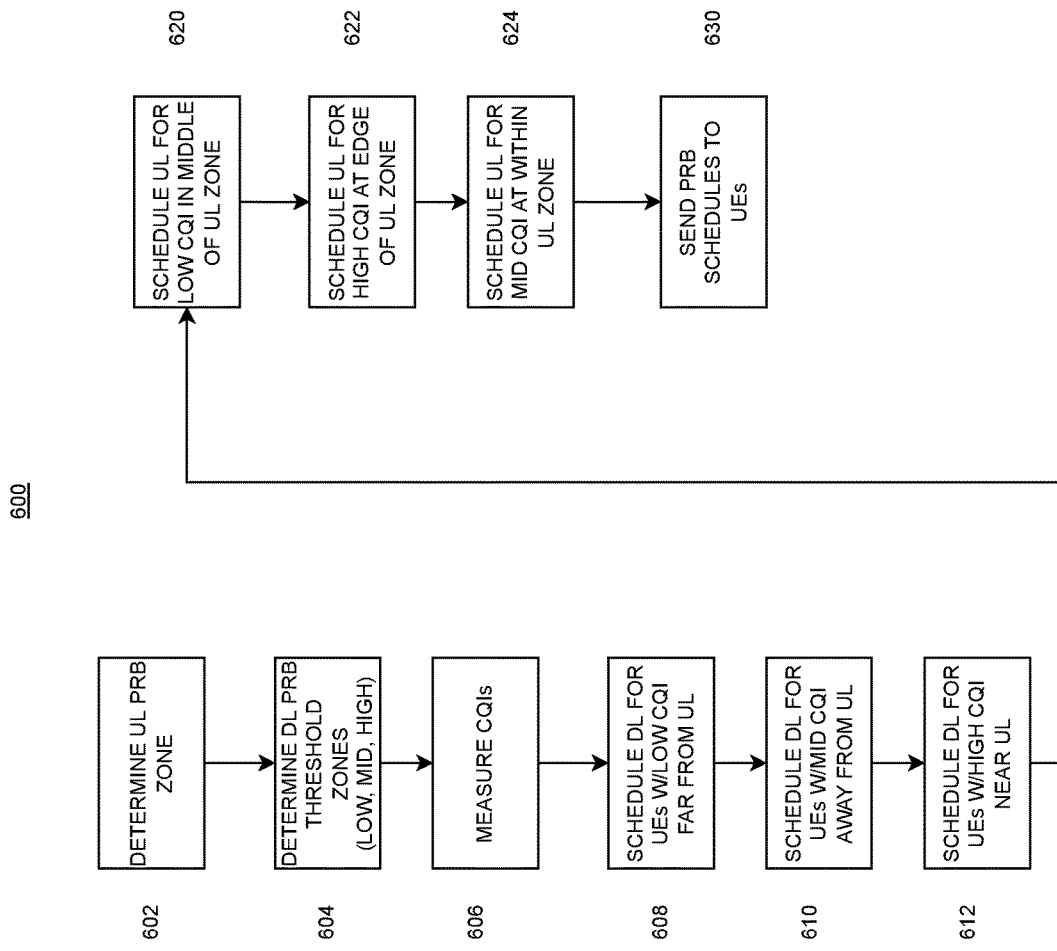
FIG. 6 is an example assignment of uplink and downlink resources.

FIG. 6 illustrates a method 600 which may be carried out by interference mitigation 150 of FIG. 1 schedule downlink PRBs based on CQI or some other indicia of relative signal strength.

In a first state 602 the size of the uplink zone 502 is determined. This may be based on how much uplink traffic is expected versus downlink traffic.

In state 604 the gNodeB may then determine the location of the different downlink PRB thresholds 516-1, 518-1, 516-2, 518-2. Threshold Setting 153 may fix the location of these threshold zones in advance, or may adapt to the present traffic observed by the gNodeB. For example, when there are more UEs expected to have relatively low CQI, then thresholds 516-1, 516-2 may be adjusted inward to make more downlink PRBs available for the low CQI UEs—in other words making the low CQI zone(s) 504-L-1, 504-L-2 larger. Also, when most of the UEs assigned to the gNodeB are expected (or measured) to have high CQI, then thresholds 518-1, 518-2 might be shifted outward to allow greater space for handling UEs with high CQI.

In a next state 606, data is collected by CQI Measurement 152 for each active UE. The CQI may be measured by each UE during a downlink PRB and reported back to the gNodeB. For 3GPP compliant networks, the CQI report may be via a control channel message such as a Dedicated Control Channel (DCCH) message. In other scenarios, CQI may be reported differently, or measured by the gNodeB directly from the RF signal it receives on an uplink channel associated with a given UE.

It should be understood that although not shown as a separate state in FIG. 6, the CQI measurements may be fed back to Threshold Setting 153 as part of state 604, to enable adaptively setting the downlink thresholds 516-1, 518-1, 516-2, 518-2 (see FIG. 5) based on current conditions.

In state 608, downlink PRB's for UEs that are further away from the gNodeB (having weaker downlink power) may be scheduled further away from the uplink PRBs.

In state 610, UEs that are located closer to the gNodeB may have their downlink PRB's located somewhat closer to the uplink PRBs than for low CQI UEs. It may, in some instances, be desirable to include a guard band between the uplink and downlink PRBs, even for these middle range UEs.

In state 612, UEs that are located closest to the gNodeB and having the strongest CQI have downlink PRBs assigned to be adjacent to the uplink PRBs.

As can now be appreciated, creating isolation between uplink and downlink PRBs may mitigate interference especially for low CQI links.

Other types of interference can also be mitigated using similar techniques for scheduling uplink and download link PRBs taking into account the potential for Cross Link Interference (CLI).

Figure 7:
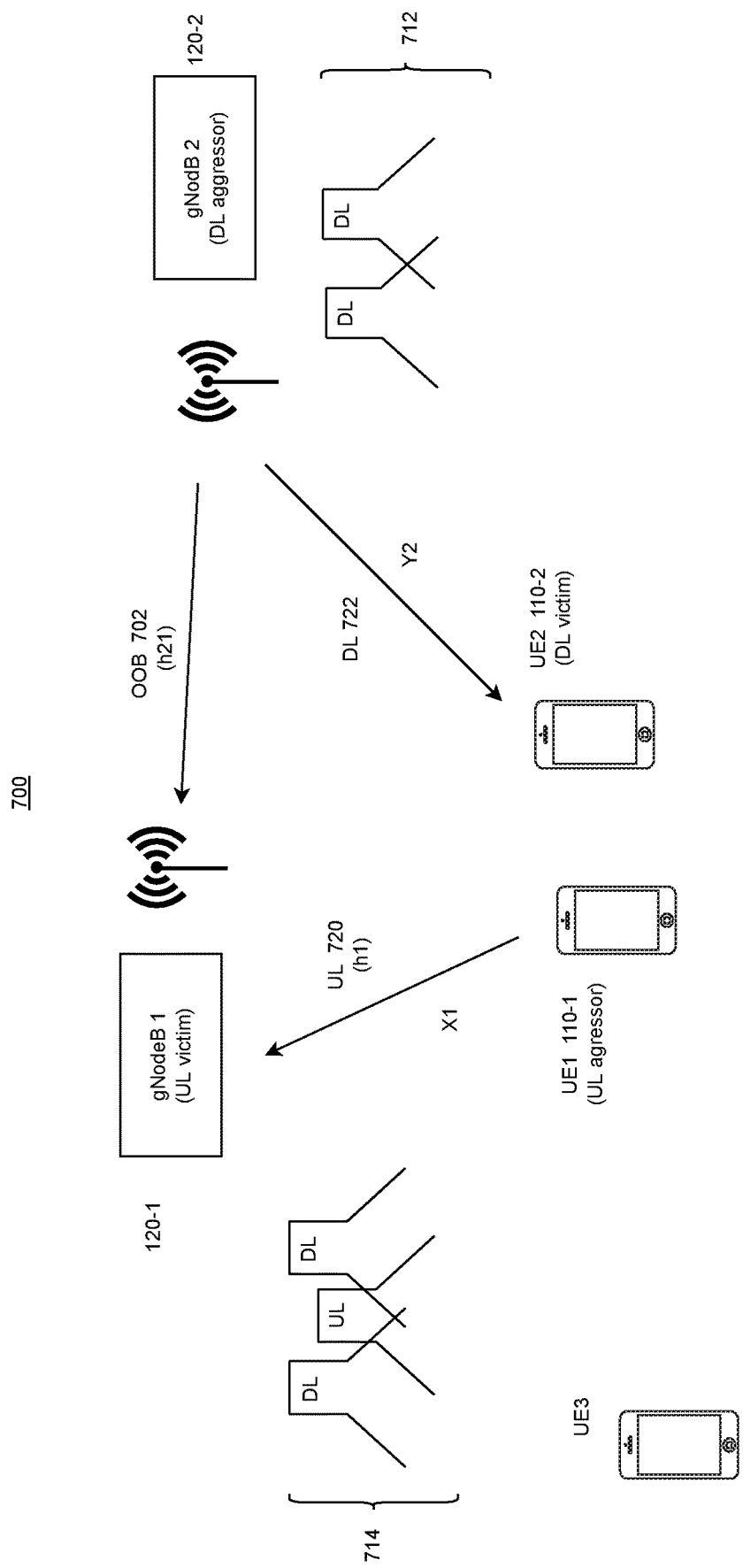
FIG. 7 illustrates interference between a gNodeB and a neighboring gNodeB.

One such scenario is shown in FIG. 7. In this embodiment, similar to the scenario in FIG. 3, gNodeB 1 is receiving information on a uplink PRB 720 from UE 1. At the same time, gNodeB 2 is transmitting on downlink PRB 722 to UE2. Note that the radiated power level of downlink transmission by gNodeB 2 does not depend on the distance between gNodeB 2 and UE 2—in other words, the radiated power may be relatively strong even when UE2 is close to gNodeB 2. This in turn may cause gNodeB 1 to also receive the downlink transmission from gNodeB 2, causing Cross Link Interference.

Information regarding the state of the resulting "crosslink" or "out of band" channel 702 between gNodeB 1 and gNodeB 2 can be used to mitigate such CLI. Generally, speaking, if gNodeB 1 knows how to characterize channel 702 (such as channel 702's transfer function), and also knows the signal transmitted by gNodeB 2 on downlink 722, gNodeB 1 can estimate such interference and remove it from the uplink signal 720 received from UE1. This estimate may be provided by Channel Estimate 154 function as part of Interference Mitigation 150.

Figure 8:
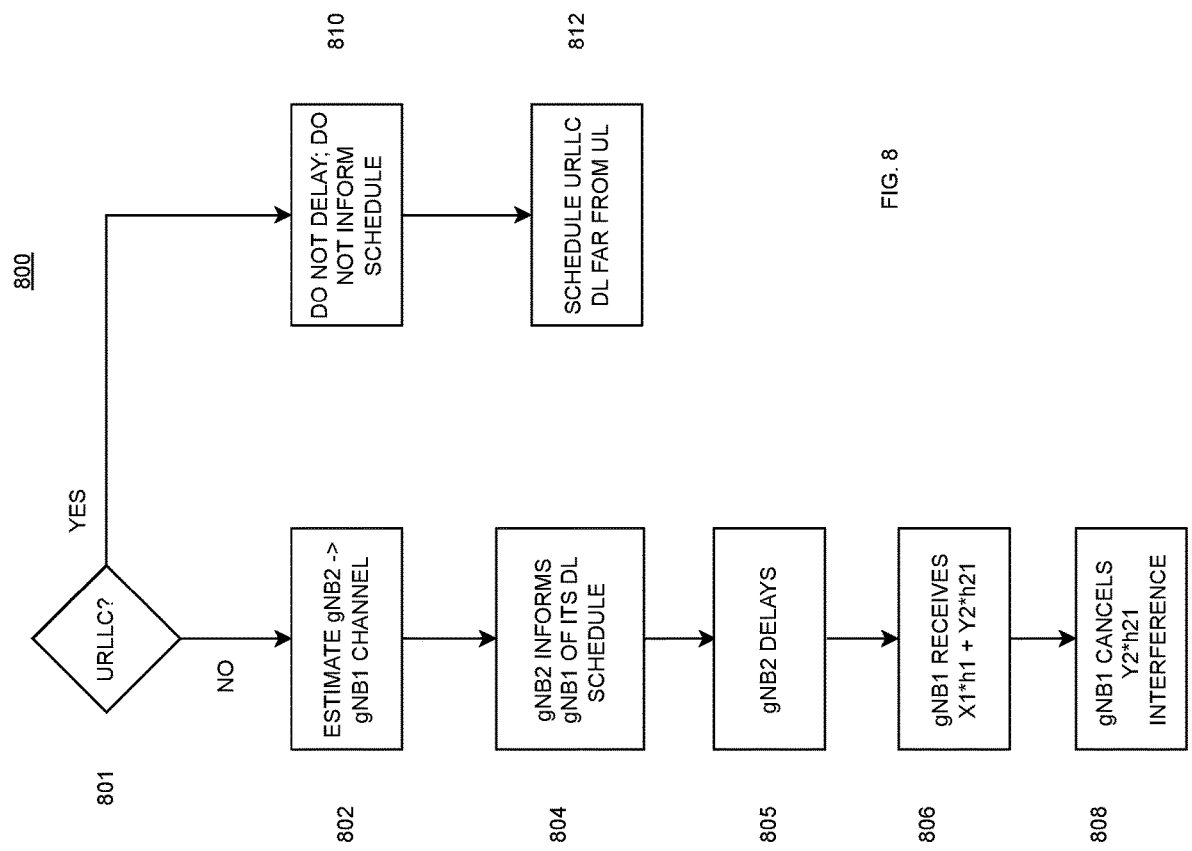
FIG. 8 illustrates methods to mitigate interference when an estimate of the neighboring gNodeB channel is available.

FIG. 8 illustrates an example method 800 to implement this technique. In state 801, gNodeB 1 may determine whether current traffic is identified as Ultra Reliable Low Latency Communication (URLLC). If not, it may proceed to state 802. However, if URLLC services necessary, then state 810 is entered.

In state 802, gNodeB 1 receives information that characterizes the cross link channel 702 between itself and gNodeB 2. This may be done by having gNodeB 2 periodically and briefly transmit a known signal (such as on a control channel without other signals) so that gNodeB 1 can periodically detect and characterize channel 702 such as by its determining its transfer function (h21).

In state 804, gNodeB 2 informs gNodeB 1 of its downlink schedule decision(s) at least one slot ahead of actual downlink transmission(s) 722.

In state 805, gNodeB 2 transmits on downlink PRB 722 (delayed by one time slot)

Next, in state 806 gNodeB 1 receives the uplink 720 from UE1. The signal received by gNodeB 1 can be estimated as $$X1*h1+Y2*h21$$

where * indicates convolution, h1 is the uplink channel, X1 is the signal transmitted by UE1 to gNodeB 1 on uplink PRB 720, and Y2 is the downlink signal transmitted by gNodeB 2 to UE2 at the same timeslot that UE1 transmits signal X1 to gNodeB1.

As mentioned above, the assumption is that gNodeB2 informs gNodeB1 of its scheduling decision and content of Y2 through link 702 at least one time slot ahead of time. This information includes the actual complex signal it intends to send (including the payload information, coded bits, etc) as well as the PRB(s) in which Y2 is scheduled to be transmitted.

In state 808, given that gNodeB 1 knows h21 and Y2 (the signal transmitted by gNodeB 2) it can determine Y2*H21 and thus cancel the CLI (e.g., the "out of band transmission") introduced into Y2 by gNodeB 2.

Alternatively, for the URLLC traffic the one slot delay imposed on gNodeB 2 in state 806 may not be acceptable.

In state 812 such URLLC traffic may not be delayed, but instead have its downlink PRBs scheduled in the low CQI zone(s), far from the uplink zones to increase guard band between them and thus mitigate interference.

Figure 9:
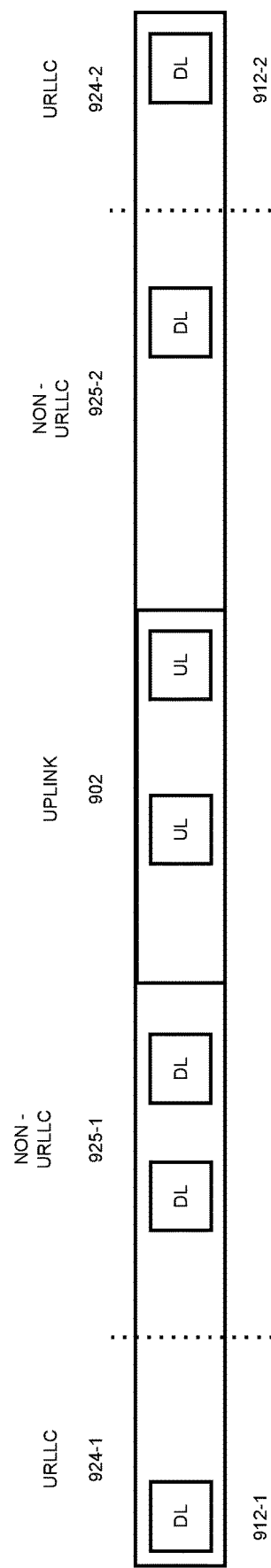
FIG. 9 illustrates how uplink and downlink for Ultra Reliable Low Latency Communication (URLLC) traffic may be allocated.

An example of such downlink PRB allocation for URLLC is shown in FIG. 9. Here the downlink PRBs 912-1, 912-2 are located in zones 924-1, 924-2 away from the uplink zone 902—regardless of the measured CQI for UE1. Non-URLLC downlinks may be assigned in the other zones 925-1, 925-2. Thus, even when the CQI for URLLC may be relatively high, the downlink PRBs appear at the outer edges of the BWP 900 to minimize CLI from the uplink PRB(s) 902.

In some implementations, an Artificial Intelligence (AI) and/or Machine Learning (ML) based processing resource can implement aspects of interference mitigation. For example, it may detect that a UE located on the cell edge and thus operating with low CQI is not actually interfering with other UEs. In that case, the low CQI UE may be scheduled anywhere.

Referring back to FIG. 1, one example implementation uses an AI/ML based engine 160 to analyze data it receives from CQI measurements 152 and/or channel estimates 154 to detect whether a particular device (UE) is not impacted from interference created by uplink transmissions of the devices. In other words, the AI/ML engine may determine that the particular UE device is located at a cell edge, and that there is no other UE device currently transmitting on the uplink close to this particular device. Example situations may be as were depicted in FIG. 4 and/or FIG. 7. Although UE3 of FIG. 4 is located near the cell edge, it is not experiencing interference from any of the other active UEs in the cell. Similarly, U3 in FIG. 7 is not experiencing any interference from gNodeB2. The AI/ML engine can thus detect these situations, and inform UL/DL assignment that UE3's downlink PRBs can be scheduled within any of the available downlink zones (low CQI zones 524-L-1, 524-L-2, mid CQI zones 524-M-1, 524-M-2, or high CQI zones 524-H-1, 524-H-2.

AI/ML engine 160 may include methods to train a machine learning model to determine when an UE is located at the edge of a cell but is not likely to be experiencing interference from other UEs. A set of training data can include characteristics on a large number of CQI measurements and/or channel estimates for cell edge UEs, along with data about where the other UEs are located when those measurements were taken.

For example, one possible machine learning implementation can involve a neural network being trained based on some or all of these characteristics. These characteristics can serve as input features to the neural network. The neural network may then perform a classification based on the features to inform UL/DL Assignment 156 that is it free to assign the particular UE a PRB outside of the usual low CQI zone.

In some embodiments, other forms of machine learning may be used to estimate whether the cell edge UE is likely to be experiencing interference from other UEs, and then inform the UL/DL Assignment 156 of that determination. UL/DL Assignment may then use that determination of the likelihood of interference to chose the appropriate PRB zone for the UE.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional states or steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may the execute the program code to perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

The above description has particularly shown and described example embodiments. However, it will be understood by those skilled in the art that various changes in form and details may be made therein without departing from the legal scope of this patent as encompassed by the appended claims.

The invention claimed is:

1. A method for wireless communication, comprising:
establishing, by a wireless network, time domain resources and frequency domain resources to implement wireless communication by a base station;
allocating an uplink resource and a downlink resource for communication between the base station and a user equipment device, the uplink resource and downlink resource each specified by a respective time domain resource and respective frequency domain resource, the frequency domain resource allocated to the uplink resource and the frequency domain resource allocated to the downlink resource allocated to enable full duplex communication;
performing, by the base station, communication with the user equipment device using the uplink resource and the downlink resource;
cancelling Cross Link Interference (CLI) on the uplink resource caused by a neighboring base station by further:
  characterizing a communication path that introduces the CLI on the uplink resource;
  informing, by the neighboring base station, of a downlink resource scheduling decision;
  delaying, by the neighboring base station, a downlink resource transmission;
  receiving, by the base station, the delayed downlink resource transmission; and
  correcting transmissions received on the uplink resource based on the characterizing the communication path that introduces the CLI on the uplink resource and the delayed downlink resource transmission.

2. The method of claim 1 wherein characterizing the communication path further comprises:
periodically receiving a known signal from the neighboring base station.

3. The method of claim 1 wherein the informing step is performed at a predetermined time before the downlink resource transmission by the neighboring base station.

4. The method of claim 2 wherein the step of correcting transmissions received via the uplink resource further comprises:
estimating the transmissions received via the uplink resource as $X1*h1+Y2*h21$ where * indicates convolution, h1 is an uplink resource channel estimate, X1 is the signal transmitted on the uplink resource, Y2 is a known signal transmitted by the neighboring base station, and h21 is the characterization of the communication path that introduces the CLI on the uplink resource.

5. The method of claim 1 additionally wherein the frequency domain resources are allocated in groups, with a first group of frequency domain resources having frequencies located in a middle portion of the frequency domain resources, and a second group of frequency resources having frequencies either lower than or greater than the frequency resources in the middle portion.

6. The method of claim 5 additionally comprising:
when the communication is identified as Ultra Reliable Low Latency Communication (URLLC), then
not performing the step of cancelling CLI on the uplink resource, and instead allocating the frequency domain resource for the uplink resource in the first group of frequency resources, and allocating the frequency domain resource for the downlink resource in the second group of frequency domain resources.

7. The method of claim 1 additionally comprising:
determining a Channel Quality Index (CQI) indicative of a radio frequency (RF) signal strength associated with communication between the base station and a user equipment device;
wherein a relative spacing between the frequency domain resource allocated for the uplink and the frequency domain resource allocated for the downlink depends on the CQI.

8. The method of claim 7 additionally comprising:
determining a second Channel Quality Index (CQI) that depends on a radio frequency (RF) signal strength associated with communication between the base station and a second user equipment;
allocating a second uplink resource and a second downlink resource for use by the second user equipment, the second uplink resource and second downlink resource each specified by a respective frequency domain resource and a respective time domain resource, the resources allocated to enable full duplex communication by the second user equipment;
wherein the frequency domain resource allocated for the second uplink resource is located in a predetermined portion of the frequency domain resources;
wherein a relative spacing between the frequency domain resource allocated for the second uplink resource and the frequency domain resource allocated for the second downlink resource depends on the second CQI; and
performing, by a base station, communication with the second user equipment using the second uplink resource and the second downlink resource.

9. The method of claim 8 additionally wherein:
when the CQI is below a low threshold, the frequency domain resource selected for the second downlink resource is a frequency domain resource located within a second group of frequency domain resources and located away from the frequency domain resource assigned to the second uplink resource; and when the CQI is above a high threshold, the frequency domain resource selected for the second downlink resource is located within the second group of frequency domain resources and located near the frequency domain resource assigned to the second uplink resource.

10. The method of claim 1 additionally comprising:
performing a machine learning process to analyze one or more characteristics of the communication between the base station and the user equipment device, wherein the one or more characteristics of communication include a likelihood the user equipment device is experiencing interference from neighboring user equipment devices; and
further allocating the uplink resource and downlink resource depending on such likelihood.

11. A base station apparatus comprising:
a transceiver configured to transmit and receive signals to and from a user equipment device;
one or more processors coupled to the transceiver; and
one or more computer readable media including instructions that, when executed by the one or more processors, cause the one or more processors to perform a process for:
establishing time domain resources and frequency domain resources to implement wireless communication;
allocating an uplink resource and a downlink resource for communication between the base station and the user equipment device, the uplink resource and downlink resource each specified by a respective time domain resource and frequency domain resource, the frequency domain resource allocated to the uplink resource and the frequency domain resource allocated to the downlink resource also allocated to enable full duplex communication;
performing, by the base station, communication with the user equipment device using the uplink resource and the downlink resource; and
cancelling Cross Link Interference (CLI) on the uplink resource caused by a neighboring base station by further:
characterizing a communication path that introduces the CLI on the uplink resource;
being informed, from the neighboring base station, of a downlink resource scheduling decision;
receiving, by the base station, a delayed downlink resource transmission; and
correcting transmissions received on the uplink resource based on the delayed downlink resource transmission and the characterizing the communication path that introduces the CLI on the uplink resource.

12. The apparatus of claim 11 wherein the one or more processors further perform the process of characterizing the communication by:
periodically receiving a known signal from the neighboring base station.

13. The apparatus of claim 11 wherein the one or more processors are further for informing of the downlink resource scheduling decision at a predetermined time before the downlink resource transmission by the neighboring base station.

14. The apparatus of claim 11 wherein the one or more processors further perform the process of correcting transmissions received via the uplink resource by:
estimating the transmissions received via the uplink resource as $X1*h1+Y2*h21$ where * indicates convolution, h1 is an uplink resource estimate, X1 is the signal transmitted on the uplink resource, Y2 is a known signal transmitted by the neighboring base station, and h21 is the characterization of the communication path that introduces the CLI on the uplink resource.

15. The apparatus of claim 11 wherein the one or more processors further perform the process of allocating the frequency domain resources in groups, with a first group of frequency domain resources having carrier frequencies located in a middle portion of the frequency domain resources, and a second group of frequency resources having carrier frequencies either lower than or greater than the frequency resources in the middle portion.

16. The apparatus of claim 15 wherein the one or more processor further perform the process of:
when the communication is identified as Ultra Reliable Low Latency Communication (URLLC),
not cancelling the CLI on the uplink resource, and instead allocating the frequency domain resource for the uplink resource in the first group of frequency domain resources, and allocating the frequency domain resource for the downlink resource in the second group of frequency domain resources.

17. The apparatus of claim 11 wherein the one or more processors further perform the process of:
determining a Channel Quality Index (CQI) indicative of a radio frequency (RF) signal strength associated with communication between the base station and a user equipment device; and
wherein a relative spacing between the frequency resource allocated for the uplink and the frequency resource allocated for the downlink depends on the CQI.

18. The apparatus of claim 17 wherein the one or more processors further perform the process of:
determining a second Channel Quality Index (CQI) that depends on a radio frequency (RF) signal strength associated with communication between the base station and a second user equipment;
allocating a second uplink resource and a second downlink resource for use by the second user equipment, the second uplink resource and second downlink resource each specified by a respective frequency domain resource and respective time domain resource, to enable full duplex communication by the second user equipment;
wherein the frequency domain resource allocated for the second uplink resource is located in a predetermined portion of the frequency domain resources;
wherein a relative spacing between the frequency domain resource allocated for the second uplink resource and the frequency domain resource allocated for the second downlink resource depends on the second CQI; and
performing, by a base station, communication with the second user equipment using the second uplink resource and the second downlink resource.

19. The apparatus of claim 18 wherein the one or more processors further perform the process of:
when the CQI is below a low threshold, the frequency domain resource selected for the second downlink resource is a frequency domain resource located within a second group of frequency domain resources and located away from the frequency domain resource assigned to the second uplink resource; and
when the CQI is above a high threshold, the frequency domain resource selected for the second downlink resource is located within the second group of frequency domain resources and located near the frequency domain resource assigned to the second uplink resource.

20. The apparatus of claim 18 additionally wherein the one or more processors for further perform the process of:
performing a machine learning process to analyze one or more characteristics of the communication between the base station and the user equipment device, wherein the one or more characteristics of communication include a likelihood the user equipment device is experiencing interference from neighboring user equipment devices; and
allocating the uplink resource and downlink resource depending on such likelihood.

* * * * *